US009521658B2

(12) United States Patent
Henneberg Rysgaard

(10) Patent No.: US 9,521,658 B2
(45) Date of Patent: Dec. 13, 2016

(54) COMMUNICATION DEVICE AND METHOD FOR RECEIVING INFORMATION

(71) Applicant: Intel Mobile Communications GmbH, Neubiberg (DE)

(72) Inventor: Bent Henneberg Rysgaard, Aalborg Oest (DK)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 452 days.

(21) Appl. No.: 13/781,872

(22) Filed: Mar. 1, 2013

(65) Prior Publication Data

US 2014/0247813 A1 Sep. 4, 2014

(51) Int. Cl.
*H04W 72/04* (2009.01)
*H04W 72/12* (2009.01)
*H04W 76/02* (2009.01)

(52) U.S. Cl.
CPC ............ *H04W 72/04* (2013.01); *H04W 72/12* (2013.01); *H04W 76/025* (2013.01)

(58) Field of Classification Search
None
See application file for complete search history.

(56) References Cited

U.S. PATENT DOCUMENTS

| 8,064,405 | B2 | 11/2011 | Parekh et al. |
| 8,369,853 | B1 | 2/2013 | Sarkar et al. |
| 2006/0223557 | A1* | 10/2006 | Manohar ..................... 455/502 |
| 2009/0180451 | A1* | 7/2009 | Alpert ............... H04W 72/1215 370/338 |
| 2012/0040670 | A1* | 2/2012 | Chin .................. H04W 60/005 455/435.1 |
| 2012/0190362 | A1 | 7/2012 | Subbarayudu et al. |
| 2012/0264390 | A1 | 10/2012 | Clevorn et al. |
| 2012/0327912 | A1 | 12/2012 | Kirveskoski |

(Continued)

FOREIGN PATENT DOCUMENTS

EP 2472960 A1 7/2012

OTHER PUBLICATIONS

Office Action received for corresponding German Patent Application No. 10 2014 101 052.3, mailed on Aug. 8, 2016, 7 pages, for reference purpose.

*Primary Examiner* — Chirag Shah
*Assistant Examiner* — Amar Persaud

(57) ABSTRACT

A communication device is described including a transceiver configured to establish a communication connection via a first radio cell and to carry out data communication via the communication connection according to a frame structure including a plurality of frames, a determiner configured to determine timings for a plurality of data communications via a second radio cell, determine whether, for any frame of the plurality of frames, the number of timings falling within the frame is above a predetermined threshold and determine, if for any frame of the plurality of frames, the number of timings falling within the frame is above the predetermined threshold, change the timings such that for no frame of the plurality of frames the number of timings falling within the frame is above the predetermined threshold and a controller configured to control the transceiver to carry out the data communications via the second radio cell according to the timings.

15 Claims, 7 Drawing Sheets

(56) References Cited

U.S. PATENT DOCUMENTS

| | | | |
|---|---|---|---|
| 2013/0016696 A1* | 1/2013 | Adjakple | H04W 76/025 370/331 |
| 2013/0023275 A1 | 1/2013 | Mutya et al. | |
| 2013/0090137 A1* | 4/2013 | Krishnamoorthy | H04W 68/02 455/458 |
| 2013/0142157 A1* | 6/2013 | Pesola | 370/329 |
| 2013/0150095 A1* | 6/2013 | Mehio | H04W 8/183 455/458 |
| 2013/0235814 A1* | 9/2013 | Wietfeldt | H04W 16/14 370/329 |
| 2013/0244660 A1* | 9/2013 | Kumar | H04W 36/165 455/436 |
| 2014/0036710 A1* | 2/2014 | Chin | H04W 24/10 370/252 |
| 2014/0087785 A1* | 3/2014 | Smadi | H04J 11/0023 455/552.1 |
| 2014/0199993 A1* | 7/2014 | Dhanda et al. | 455/423 |
| 2014/0204866 A1* | 7/2014 | Siomina et al. | 370/329 |
| 2014/0228070 A1* | 8/2014 | Josso et al. | 455/552.1 |
| 2014/0315597 A1* | 10/2014 | Periyalwar | H04W 76/026 455/552.1 |

* cited by examiner

COMMUNICATION DEVICE AND METHOD FOR RECEIVING INFORMATION

TECHNICAL FIELD

The present disclosure relates to communication devices and methods for receiving information.

BACKGROUND

When operating a communication device, the case may occur that the reception of two sets of information, which should both be received by the mobile communication device, has a conflict, e.g. due to the collision of the transmission timing of the two sets of information. For example, a communication device including two SIMs (Subscriber Identity Modules) which are in service in parallel may need to receive paging information or system information from one base station for one of the SIMs while having a dedicated connection to another base station for the other of the SIMs. Efficient reception of both sets of information is desirable.

SUMMARY

A communication device is provided including a transceiver configured to establish a communication connection via a first radio cell and to carry out data communication via the communication connection according to a frame structure including a plurality of frames, a determiner configured to determine timings for a plurality of data communications via a second radio cell, determine whether, for any frame of the plurality of frames, the number of timings falling within the frame is above a predetermined threshold and determine, if for any frame of the plurality of frames, the number of timings falling within the frame is above the predetermined threshold, change the timings such that for no frame of the plurality of frames the number of timings falling within the frame is above the predetermined threshold and a controller configured to control the transceiver to carry out the data communications via the second radio cell according to the timings.

Further, a method for receiving information according to the communication device described above is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects in which the invention may be practiced. These aspects are described in sufficient detail to enable those skilled in the art to practice the invention. Other aspects may be utilized and structural, logical, and electrical changes may be made without departing from the scope of the invention. The various aspects are not necessarily mutually exclusive, as some aspects can be combined with one or more other aspects to form new aspects.

Figure 1:
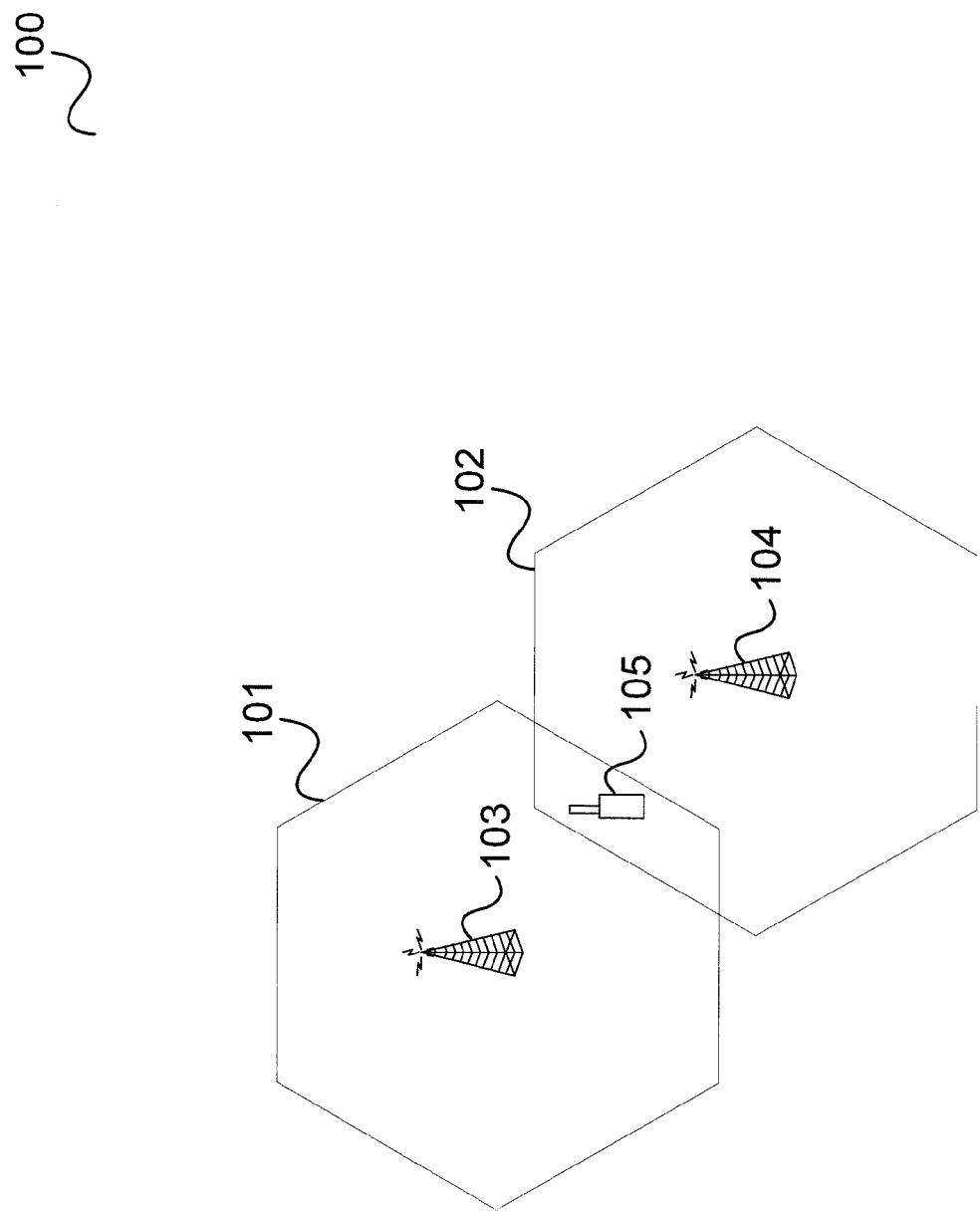
FIG. 1 shows a communication arrangement.

FIG. 1 shows a communication arrangement 100.

The communication arrangement 100 includes a first radio cell 101 and a second radio cell 102. The first radio cell 101 is operated by a first base station 103 and the second radio cell 102 is operated by a second base station 104. The first base station 103 is for example part of a radio access network of a first mobile communication network and the second base station 104 is for example part of a radio access network of a second mobile communication network. It is assumed that the first mobile communication network and the second communication network are different mobile communication networks, e.g. are operated by different operators and/or require separate subscriptions. It should however be noted that the following may also be applied to the first mobile communication network and the second communication network are the same mobile communication network.

The first mobile communication network and the second mobile communication network each may for example be a GSM (Global System for Mobile Communications) communication system, a UMTS (Universal Mobile Telecommunications System), a CDMA2000 (CDMA: Code Division Multiple Access) communication system, an LTE (Long Term Evolution) communication system or a FOMA (Freedom of Mobile Access) communication system.

The first radio cell 101 and the second radio cell 102 are assumed to overlap such that a mobile terminal 105 located in the overlap area of the first radio cell 101 and the second radio cell 102 can receive signals from both the first base station 103 and the second base station 104 and can use both the first communication network and the second communication network for communication.

For being able to use both the first communication systems and the second communication system, the mobile terminal 105 may include two (or more) subscriber identity modules, e.g. SIMs or USIMs (Universal Subscriber Identity Modules). In other words, the mobile terminal 105 may be a multi-SIM device supporting communication via two (or more) different mobile communication networks.

The mobile terminal 105 may be only able to receive data from either the first base station 103 or the second base station 104 at a time. For example, the mobile terminal 105 comprise a transceiver that is only able to tune to a communication channel of either the first base station 103 or the second base station 104 at a time and/or is only able to tune to either the frequency range used by the first base station 103 for operating the first radio cell 101 or the frequency range used by the second base station 104 for operating the second radio cell 102.

The mobile terminal 105 may for example include a first SIM for using the first communication network and a second SIM for using the second communication network. The mobile terminal 105 may be able to still monitor for calls incoming via the second communication network while in a call or data transfer via the first communication network. For this, the mobile terminals may include transmission gaps in the call and/or data connection and switch its RF receiver to the second radio cell 102 to monitor for incoming calls.

The mobile terminal 105 may for example create a transmission gap for only some or all idle mode procedures to be carried out for the second communication network (such as paging). For example, the mobile terminal 105 may only create transmission gaps for listening to paging messages or may also create gaps for receiving system information, monitoring neighbor radio cells, doing reselections, etc.

For the call or data transfer it would typically be desirable that the number of transmission gaps is reduced. For example, just listening for paging messages of the second communication network with worst case network setup may reduce the maximum data transfer rate of a (e.g. TCP) data connection via the first communication network by as much as 32%. This does not even take into account that the TCP (Transmission Control Protocol) connection could further worsen this number e.g. due to overhead. Similarly, a speech connection may be impaired by transmission gaps.

Accordingly, avoiding transmission gaps for using the second communication network in an active data connection via the first communication network is desirable.

In the following, a communication device is described that may reduce the negative impact of activities in context of a second communication network on a communication connection with a first communication network.

Figure 2:
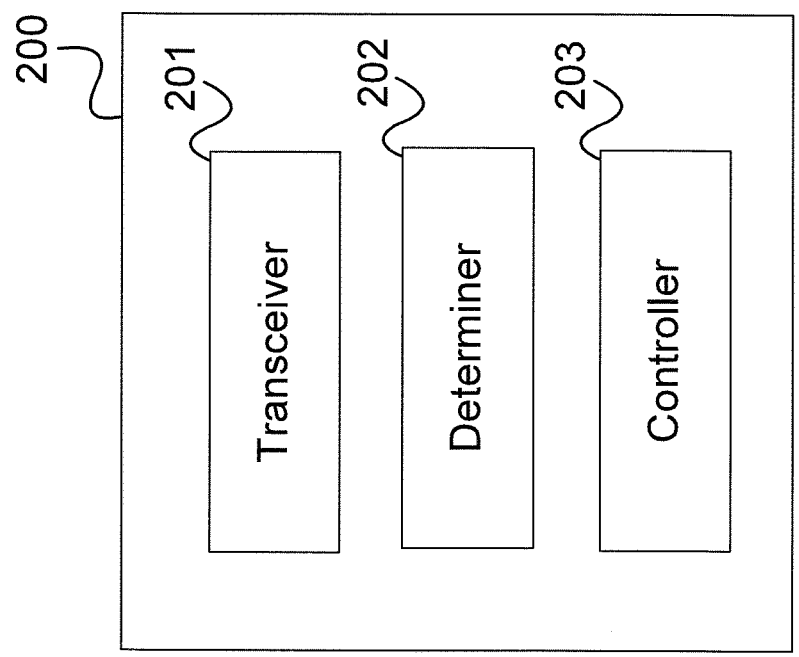
FIG. 2 shows a communication device.

FIG. 2 shows a communication device 200.

The communication device 200 includes a transceiver 201 configured to establish a communication connection via a first radio cell and to carry out data communication via the communication connection according to a frame structure including a plurality of frames.

The communication device 200 further comprises a determiner 202 configured to determine timings for a plurality of data communications via a second radio cell, determine whether, for any frame of the plurality of frames, the number of timings falling within the frame is above a predetermined threshold and, if for any frame of the plurality of frames, the number of timings falling within the frame is above the predetermined threshold, change the timings such that for no frame of the plurality of frames the number of timings falling within the frame is above the predetermined threshold.

Additionally, the communication device 200 comprises a controller 203 configured to control the transceiver 201 to carry out the data communications via the second radio cell according to the timings (as determined and possibly changed by the determiner).

In other words, a communication device determines whether too many communication activities via a second radio cell fall within a frame of the communication via a first radio cell. For example, the transceiver can either communicate via the first radio cell or the second radio cell such that the number of communication activities via the second radio cell carried out corresponds to interruptions of the communication via the first radio cell, i.e. gaps within the communication via the first radio cell. Keeping the number of timings for data communications via the second radio cell below a threshold may allow keeping gaps short such that they are not detected by the transceiver in receiving the affected signals. In other words, gaps may be kept short enough to not affect data transfer via the first radio cell and thereby effectively not generating disturbing gaps in data transmission via the first radio cell. In other words, for example, the impact on an active connection via a first carrier is reduced by minimizing the time used on a second carrier by reducing the number of bursts received via the second carrier during one frame of the first carrier.

The data communications via the second radio cell are for example data receptions via the second radio cell. This may for example include reception of speech data in a call.

The data communications via the second radio cell may for example be receptions of control information via the second radio cell.

For example, the data communications via the second radio cell are receptions of paging information via the second radio cell.

The determiner is for example configured to determine the timings as the timings of data transmissions by a network component (e.g. a base station) via the second radio cell.

The determiner is for example configured to change the timings by reducing the number of timings, e.g. the number of communication events.

Reducing the number of timings for example includes cancelling at least one data communication of the plurality of data communications. The data communications may for example be data receptions. Accordingly. The number of timings may for example be reduced by cancelling one reception event.

The determiner is for example configured to change the timings by changing the timing of at least one data communication of the plurality of data communications, e.g. shifting the timing of the at least one data communication (to be earlier or later).

The predetermined threshold is for example one.

The communication device is for example a mobile communication terminal.

For example, the communication device is a subscriber terminal.

For example, the first radio cell is a radio cell of a first radio communication network and the second radio cell is a radio cell of a second radio communication network.

The communication device is for example a subscriber terminal of the first radio communication network and a subscriber terminal of the second radio communication network.

The first radio cell and the second radio cell may also be radio cells of the same radio communication network.

For example, the communication device is a subscriber terminal of the radio communication network.

The frames are for example UMTS frames or GSM frames.

The controller is for example configured to control the transceiver to carry out the data communication via the communication connection between the timings.

The controller is for example configured to control the transceiver to interrupt the data communication via the communication connection at the timings.

The timings are for example time periods (e.g. time slots) for carrying out the plurality of data communications.

The components of the communication device (such as the transceiver) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g.

a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

Figure 3:
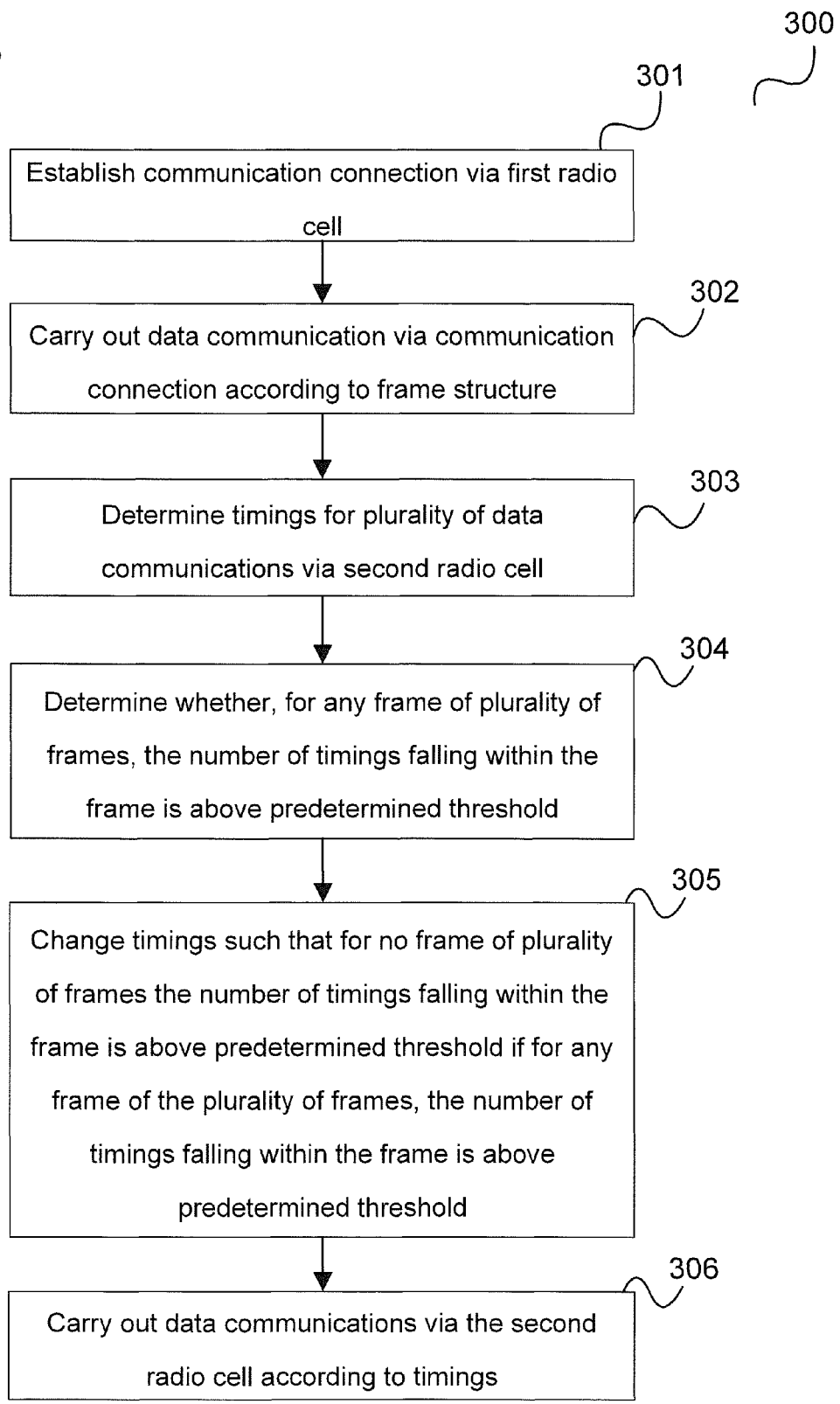
FIG. 3 shows a flow diagram illustrating a method for receiving information.

The communication device 200 for example carries out a method as illustrated in FIG. 3.

FIG. 3 shows a flow diagram 300.

The flow diagram 300 illustrates a method for receiving information, for example carried out by a communication device.

In 301, the communication device establishes a communication connection via a first radio cell.

In 302, the communication device and carries out data communication via the communication connection according to a frame structure including a plurality of frames.

In 303, the communication device determines timings for a plurality of data communications via a second radio cell.

In 304, the communication device determines whether, for any frame of the plurality of frames, the number of timings falling within the frame is above a predetermined threshold.

In 305, the communication device changes the timings such that for no frame of the plurality of frames the number of timings falling within the frame is above the predetermined threshold if for any frame of the plurality of frames, the number of timings falling within the frame is above the predetermined threshold.

In 306, the communication device carries out the data communications via the second radio cell according to the timings.

It should be noted that aspects described in context of the communication device 200 are analogously valid for the method illustrated in FIG. 3 and vice versa.

In the following, an example is described in more detail. In the following example it is assumed that the mobile terminal 105 has a data connection (e.g. via a dedicated channel) to the first base station 103 according to 3G (UMTS). It is further assumed that the second radio cell 102 is a GSM radio cell of a GSM radio communication network and the mobile terminal 105 is in idle state with regard to GSM and that the mobile terminal 105 should be reachable via the GSM radio communication network. This means that the mobile terminal 105 should be able to receive paging information sent via the second radio cell 102 via a paging channel, or more generally should be able to receive control information via an idle mode channel.

For example, the mobile terminal 105 has a USIM for communication via the first radio cell and a GSM SIM card for communication via the second radio cell. The UMTS data connection may be a continuous data transfer, but the transfer may also start or stop during the reception of the idle channel.

Figure 4:
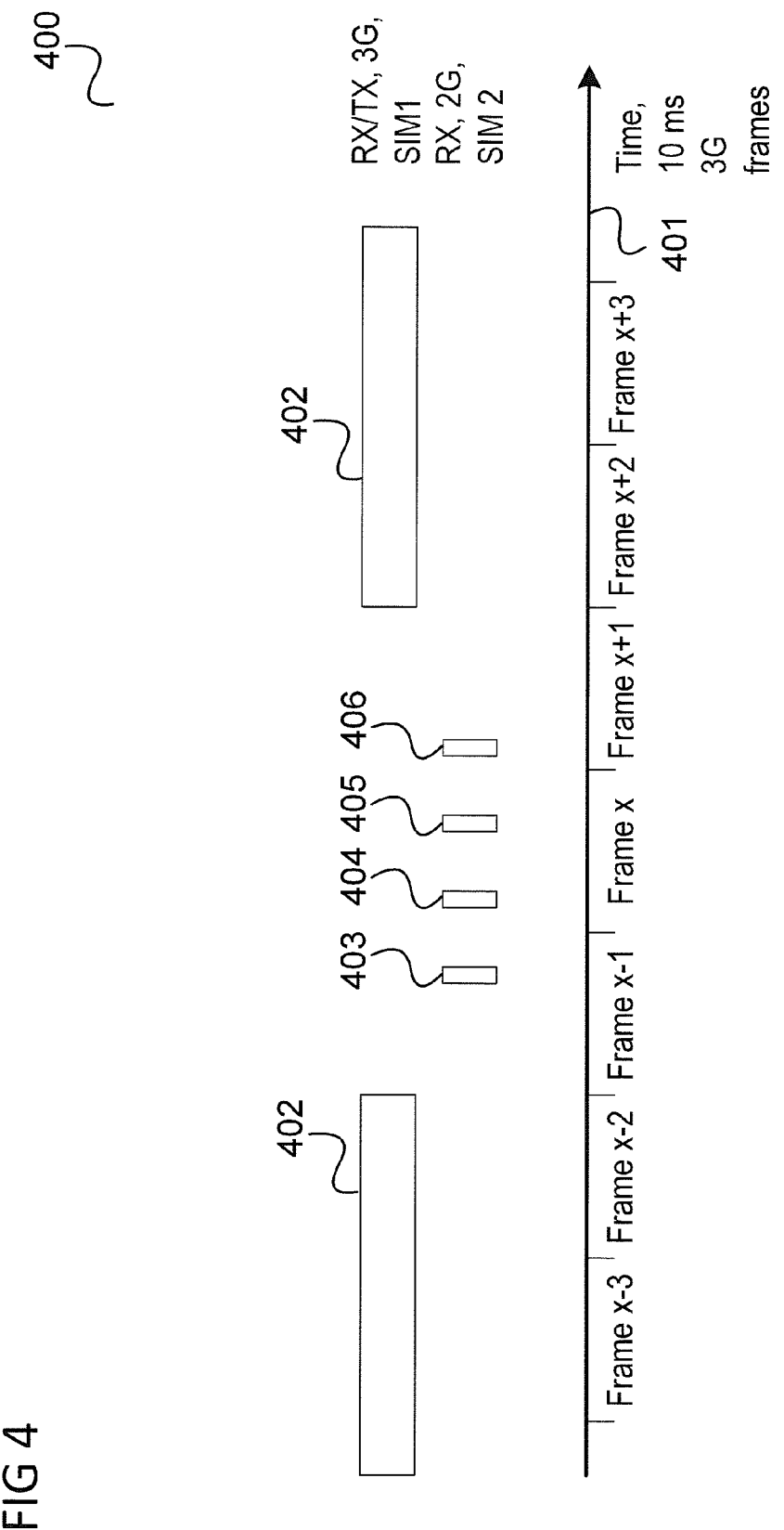
FIG. 4 shows a transmission diagram illustrating the interruption of a connection for reception of paging information.

An example of a reception of paging information during the data connection is given in FIG. 4.

FIG. 4 shows a transmission diagram 400.

In the transmission diagram 400, time flows from left to right along a time axis 401, wherein the frames according to the UMTS communication are indicated (numbered from x−3 to x+3). Each UMTS frame has a length of 10 ms.

The reception of data via the UMTS communication connection 402 (which may include a speech call) is in this example interrupted for frames x−1, x, x+1 to allow the reception of paging information of the GSM radio communication network which is transmitted in four bursts 403, 404, 405, 406. Each burst has for example the length of a GSM time slot. A GSM frame has a length of 4.615 ms and is composed of eight time slots.

In this example, the communication (which may include both signaling and data transfer) via the first radio cell 101 is lost for three UMTS radio frames, i.e. 30 ms, for the UMTS communication connection. This may waste network resources (i.e. lessen the efficiency of the bandwidth usage), reduce data throughput and increase the chance of losing the UMTS communication connection entirely as necessary signaling may be lost.

Similar gaps may be caused by the mobile terminal 105 listening to system information of the GSM radio communication network.

Figure 5:
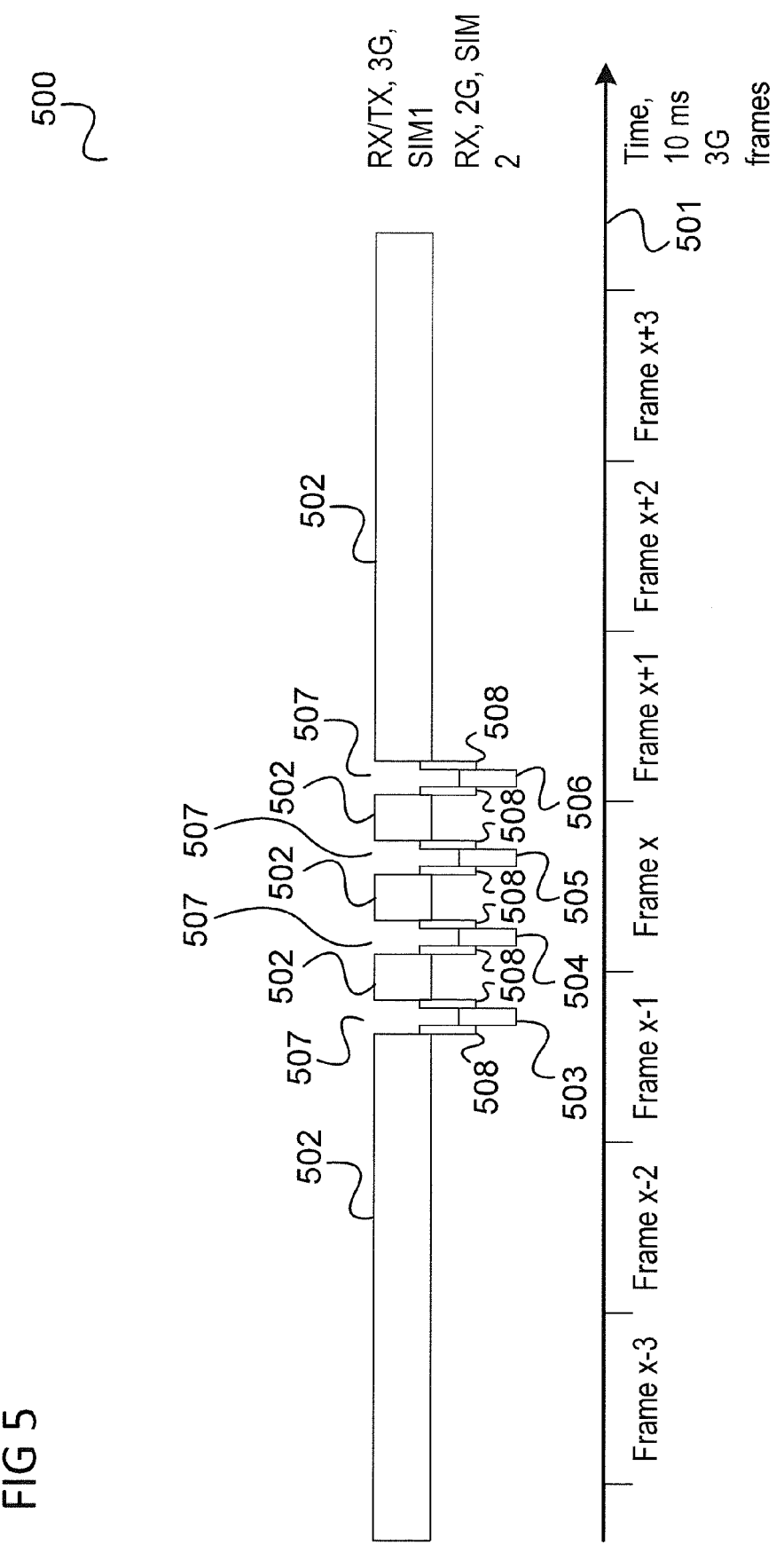
FIG. 5 shows a transmission diagram illustrating an approach with reduced overall interruption time of a connection for reception of paging information.

To reduce these effects, the mobile terminal 105 may be configured to receive via the second radio cell (e.g. to switch an antenna to GSM communication) only during the actual reception of paging information, as it is illustrated in FIG. 5.

FIG. 5 shows a transmission diagram 500.

In the transmission diagram 500, time flows from left to right along a time axis 501, wherein as in FIG. 4 the frames according to the UMTS communication are indicated (numbered from x−3 to x+3).

In this example, the reception of data via the UMTS data communication 502 is interrupted during four gaps 507 which involve the duration of the paging information bursts 503, 504, 505, 506 and switching periods 508 which are in this example required to switch the mobile terminal's transceiver between GSM communication and UMTS communication. It can be seen that the overall interruption of the reception of data of the UMTS communication connection 502 is much less than in the example shown in FIG. 4.

For example, looking at frame x−1, the impact on the UMTS communication connection is small. Each gap 702 may be 1 ms or less, which, in good radio conditions, does not prevent successful decoding at both terminal and network side of UMTS signals exchanged in the UMTS communication. Also, in case of usage of 2 ms HSPA frames for the UMTS communication connection the impact would be greatly reduced from 5 affected HSPA frames in frame x−1 to a maximum of 2 affected HSPA frames. Even in frame x, which is the most affected frame in the figure, the impact is about 2 ms or less. In good radio conditions, that would mean that signaling, e.g. FACH (Forward Access Channel), or DCH (Dedicated Channel) signaling of the UMTS connection is unaffected by the gaps created to receive the paging bursts 503, 504, 505, 506 on the GSM carrier. Thus, the risk of losing the UMTS communication connection (e.g. losing a call) calls due to missed handover, reconfigurations, etc. may be reduced.

Further, the mobile terminal 105 may receive and decode GSM blocks (i.e. in this example the paging information bursts 503, 504, 505, 506) in less than the nominal four bursts. In this way, it can for example be achieved, in good radio conditions, that each UMTS frame is only affected by one burst 503, 504, 505, 506 or less which may for example further reduce the risk of losing the UMTS communication connection and further reduce the impact of the throughput of the UMTS communication connection since the transceiver may be able to add a single short gap during each frame with relatively little loss of throughput or quality of the UMTS communication connection.

For example, the mobile terminal 105 may use an algorithm calculating which bursts 503, 504, 505, 506 to receive based on signaling quality, etc, to further reduce the impact on the UMTS communication connection. This is illustrated in the FIGS. 6 and 7.

Figure 6:
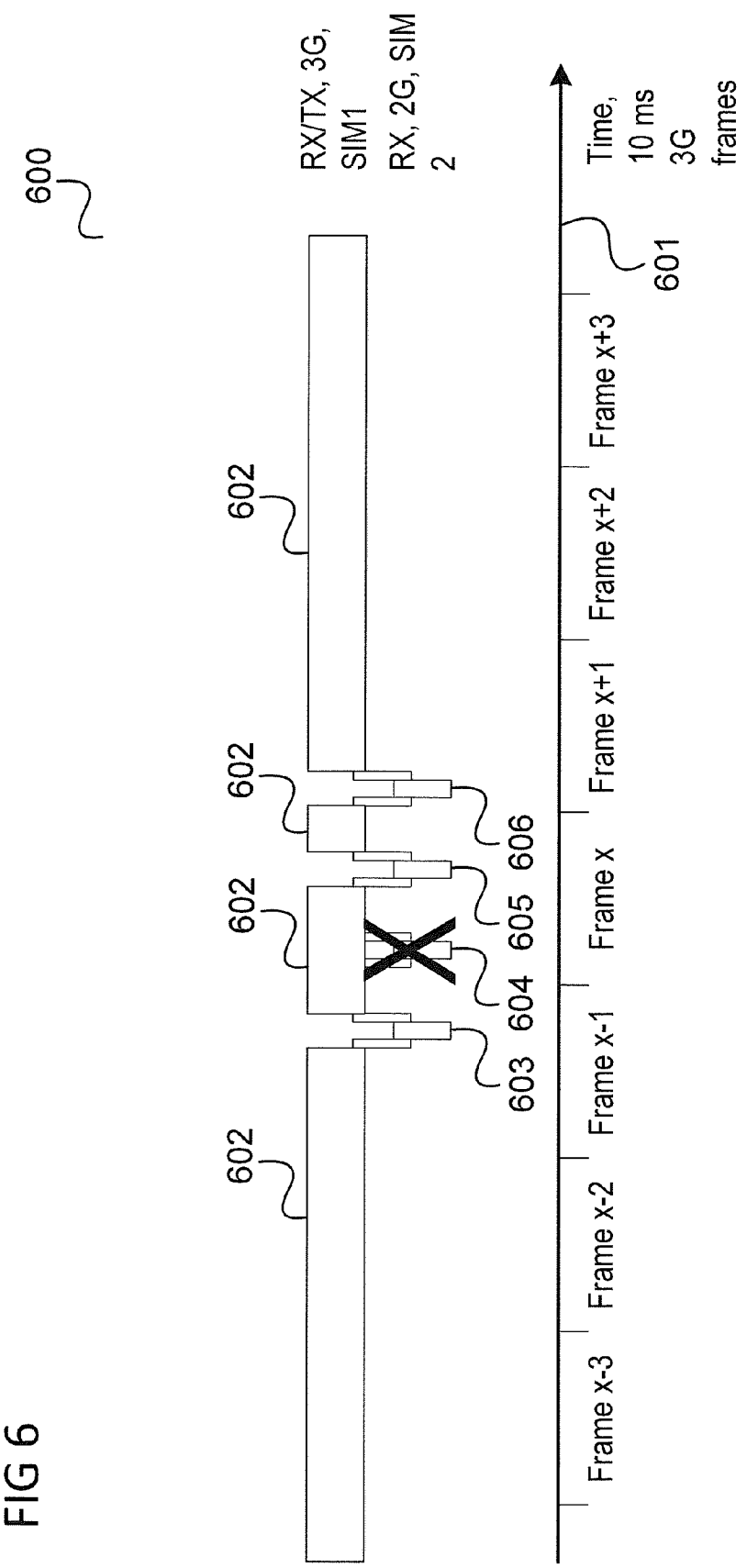
FIG. 6 shows a transmission diagram illustrating an approach with reduced interruptions per frame by skipping a paging burst.

FIG. 6 shows a transmission diagram 600.

In the transmission diagram 600, time flows from left to right along a time axis 601, wherein as in FIG. 6 the frames according to the UMTS communication are indicated (numbered from x−3 to x+3).

It is assumed that in this example, the mobile terminal 105 checks whether two of the paging information bursts 603, 604, 605, 605 fall within the same frame. Indeed, the second burst 604 and the third burst 605 fall within frame x. Therefore, the mobile terminal 105 decides, e.g. based on the fact that the reception quality is sufficient to be able to reconstruct the required paging information from only three paging information bursts, or, alternatively, in any case, to skip the reception of the second paging information burst. Accordingly, the UMTS data communication 602 is only interrupted once during each of the frames x−1, x, x+1.

Figure 7:
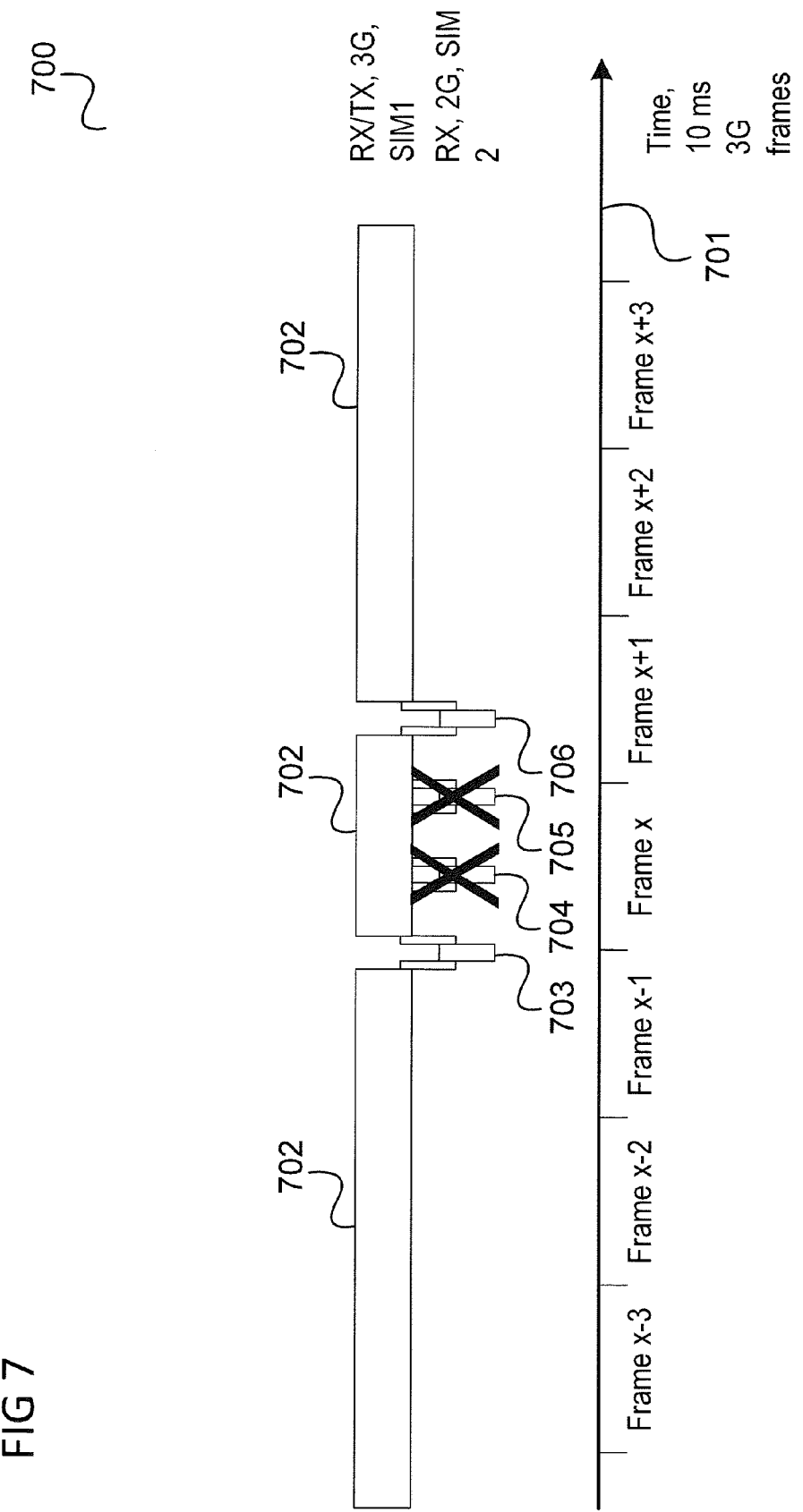
FIG. 7 shows a transmission diagram illustrating a further example for reduced interruptions per frame by skipping paging bursts.

FIG. 7 shows a transmission diagram 700.

In the transmission diagram 700, time flows from left to right along a time axis 701, wherein as in FIG. 4 the frames according to the UMTS communication are indicated (numbered from x−3 to x+3).

Similarly as in the example described with reference to FIG. 6 it is assumed that the mobile terminal 105 checks whether two of the paging information bursts 703, 704, 705, 705 fall within the same frame. In this example, part of the first burst 703, the second burst 704 and the third burst 705 fall within frame x. Therefore, the mobile terminal 105 decides, e.g. based on the fact that the reception quality is sufficient to be able to reconstruct the required paging information from only two paging information bursts, or, alternatively, in any case, to skip the reception of the second paging information burst 704 and the third paging information burst 705. Accordingly, the UMTS data communication 702 is only interrupted once during each of the frames x−1, x, x+1.

The example of FIG. 7 can be seen as a worst case scenario where the first burst 703 overlaps the frame x−1 and frame x boundary. Thus, frames x−1, x and x+1 are all affected by only receiving the first bursts 703 and the last burst 706.

In case that both radio communication networks are GSM communication networks, the approach described above may also be used. Reducing the number of bursts received for one GSM radio cell allows reducing the impact on a connection via another GSM radio cell potentially carrying a data or speech connection, for example to affecting only up to two frames of a four frame block.

In case that a communication connection is provided using the GSM radio communication network and the mobile terminal 105 should be reachable by a UMTS radio communication network, a similar approach may be applied as in the above scenario which may reduce the time the GSM communication connection is affected by reducing the time for receiving UMTS control channels, e.g. the PICH (Paging Indicator Channel), the PCH (Paging Channel) and the BCH (Broadcast Channel). In case the GSM communication connection uses one frame in uplink/downlink, then receiving BCH on UMTS can be done reversing the advantage.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
   a transceiver configured to establish a communication connection via a first radio cell and to carry out data communications via the communication connection according to a frame structure including a plurality of frames;
   a determiner configured to
      determine timings for a plurality of timings for data communications via a second radio cell,
      determine whether a number of the timings for data communications via the second radio cell is above a predetermined threshold, wherein the number of timings for data communications falls within a frame of the plurality of frames via the first radio cell;
      reduce the number of timings for data communications via the second radio cell, when the number of the timings for data communications via the second radio cell is determined to be above the predetermined threshold; wherein reducing the number of the timings for the data receptions via the second radio cell includes canceling at least one timing for data reception;
   a controller configured to control the transceiver to carry out the data communications via the second radio cell according to the reduced number of timings for data communications,
   wherein the data communications via the second radio cell are data receptions via the second radio cell.

2. The communication device according to claim 1, wherein the data receptions via the second radio cell are receptions of control information via the second radio cell.

3. The communication device according to claim 1, wherein the data receptions via the second radio cell are receptions of paging information via the second radio cell.

4. The communication device according to claim 1, wherein the determiner is configured to determine the timings as the timings of data transmissions by a network component via the second radio cell.

5. The communication device according to claim 1, wherein the determiner is further configured to reduce the timings for data communications by reducing the timing of at least one data reception of the plurality of timings for data communications.

6. The communication device according to claim 1, wherein the first radio cell is a radio cell of a first radio communication network and the second radio cell is a radio cell of a second radio communication network.

7. The communication device according to claim 6, wherein the communication device is a subscriber terminal of the first radio communication network and a subscriber terminal of the second radio communication network.

8. The communication device according to claim 1, wherein the first radio cell and the second radio cell are radio cells of the same radio communication network.

9. The communication device according to claim 8, wherein the communication device is a subscriber terminal of the radio communication network.

10. The communication device according to claim 1, wherein the frames are UMTS frames or GSM frames.

11. The communication device according to claim 1, wherein the controller is configured to control the transceiver to carry out the timings for data communications via the communication connection between the timings.

12. The communication device according to claim 1, wherein the controller is configured to control the transceiver to interrupt the timings for data communications via the communication connection at the timings.

13. The communication device according to claim 1, wherein the timings are time periods for carrying out the plurality of timings for data communications.

14. A method for receiving information comprising:

establishing a communication connection via a first radio cell;

carrying out data communications via the communication connection according to a frame structure including a plurality of frames;

determining timings for a plurality of timings for data communications via a second radio cell, determining whether a number of the timings for the data communications via the second radio cell is above a predetermined threshold; wherein the number of timings for data communications falls within a frame of the plurality of frames via the first radio cell;

reducing the number of timings for data communications via the second radio cell when the number of the timings for data communications via the second radio cell is determined to be above the predetermined threshold; wherein reducing the timings for data communications occurs by reducing the timing of at least one data reception of the plurality of timings for data communications; and carrying out the data communications via the second radio cell according to the reduced number of timings for data communications, wherein the data communications via the second radio cell are data receptions via the second radio cell.

15. The method according to claim 14, further comprising interrupting the timings for data communications via the communication connection at the timings.

* * * * *